(12) United States Patent
Christiansen et al.

(10) Patent No.: US 9,432,627 B2
(45) Date of Patent: Aug. 30, 2016

(54) RESTRICTING INFORMATION REQUESTED BY AN APPLICATION

(71) Applicant: Microsoft Corporation, Redmond, WA (US)

(72) Inventors: Dave Christiansen, Woodinville, WA (US); Sean Smith, Redmond, WA (US); Bethan Tetrault Cantrell, Redmond, WA (US); Michelle R. Bruno, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 191 days.

(21) Appl. No.: 14/019,937

(22) Filed: Sep. 6, 2013

(65) Prior Publication Data
US 2015/0071436 A1 Mar. 12, 2015

(51) Int. Cl.

| G06F 21/00 | (2013.01) |
|---|---|
| H04N 7/167 | (2011.01) |
| G06F 21/62 | (2013.01) |
| H04L 29/06 | (2006.01) |
| G06F 21/53 | (2013.01) |
| G06F 21/55 | (2013.01) |
| H04N 21/478 | (2011.01) |

(52) U.S. Cl.
CPC ............ *H04N 7/1675* (2013.01); *G06F 21/53* (2013.01); *G06F 21/554* (2013.01); *G06F 21/629* (2013.01); *H04L 63/0236* (2013.01); *H04L 63/08* (2013.01); *G06F 2221/2109* (2013.01); *H04N 21/4781* (2013.01)

(58) Field of Classification Search
CPC ...... G06F 21/60; G06F 21/604; G06F 21/62; G06F 21/6209; G06F 21/629; G06F 21/6281
See application file for complete search history.

(56) References Cited

U.S. PATENT DOCUMENTS

| 7,214,133 B2 | 5/2007 | Jen et al. |
|---|---|---|
| 2008/0254850 A1 | 10/2008 | Sylla |
| 2008/0297669 A1 | 12/2008 | Zalewski et al. |
| 2010/0081499 A1 | 4/2010 | Rathsack et al. |

(Continued)

OTHER PUBLICATIONS

PCT Demand and Response to International Search Report and Written Opinion, filed Mar. 11, 2015 in PCT Application No. PCT/US2014/053767.

(Continued)

*Primary Examiner* — Edward Zee
(74) *Attorney, Agent, or Firm* — Timothy Churna; Judy Yee; Micky Minhas

(57) ABSTRACT

The technology includes a method for a computing device (console) to restrict transferring information to others on the Internet. A user does not have to explicitly make a choice of having the console restrict the transferring of information to an external computing device because the technology determines that such information cannot be transferred. When an application is loaded, a NSAL is read to determine whether the application will communicate with an external computing device. A NSAL may include authorized network addresses that an application may communicate with when executing on a computing device. When the NSAL does not include any network addresses, there is no need to obtain consent from a user regarding transferring the information externally because the application does not have the capability to do so. When one or more network addresses are includes in a NSAL, consent from a user is obtained.

17 Claims, 8 Drawing Sheets

(56) References Cited

U.S. PATENT DOCUMENTS

| | | |
|---|---|---|
| 2010/0229214 A1 | 9/2010 | Zhu et al. |
| 2011/0105222 A1 | 5/2011 | Gagner et al. |
| 2012/0127315 A1 | 5/2012 | Heier et al. |
| 2012/0142316 A1 | 6/2012 | Park |
| 2012/0317565 A1 | 12/2012 | Carrara et al. |
| 2012/0317638 A1 | 12/2012 | Carrara et al. |
| 2014/0123208 A1* | 5/2014 | Plagemann et al. .............. 726/1 |
| 2014/0283109 A1* | 9/2014 | Quong .................... G06F 21/10 726/27 |

OTHER PUBLICATIONS

Kabus, et al., "Addressing Cheating in Distributed MMOGs", In Proceedings of 4th ACM SIGCOMM Workshop on Network and System Support for Games, Oct. 10, 2005, 6 pages.

Hong, et al., "Privacy Risk Models for Designing Privacy-Sensitive Ubiquitous Computing Systems", In Proceedings of the 5th Conference on Designing Interactive Systems: Processes, Practices, Methods, and Techniques, Aug. 1, 2004, 10 pages.

U.S. Appl. No. 14/019,978, filed Sep. 6, 2013.

"Google Chrome Extensions (Labs), Formats: Manifest Files, Google Code Labs", Published on: Oct. 19, 2011, Available at: http://web.archive.org/web/20111019061333/http://code.google.com/chrometextensions/manifest.html.

"International Search Report and Written Opinion Issued in PCT Patent Application No. PCT/US2014/053625", Mailed Date: Nov. 25, 2014, 9 Pages. (MS# 339464.02).

Office Action dated Jul. 9, 2015 in U.S. Appl. No. 14/019,978, 40 pages.

Response to Office Action dated Sep. 21, 2015 in U.S. Appl. No. 14/019,978, 13 pages.

Final Office Action dated Nov. 10, 2015 in U.S. Appl. No. 14/019,978, 68 pages.

Dufaux, "Privacy Enabling Technology for Video Surveillance", May 2, 2006, pp. 1-12.

International Preliminary Report in Patentability dated Oct. 27, 2015 in International Patent Application No. PCT/US2014/053767, 6 pages.

PCT Search Report and Written Opinion dated Feb. 3, 2015 in International Patent Application No. PCT/US2014/053767, 10 pages.

Van Schooenderwoert, et al., "Taming the Embedded Tiger—Agile Test Techniques for Embedded Software", In Conference of Agile Development, Jun. 22, 2004, pp. 120-126.

Vogel, Lars, "Android Camera API—Tutorial", Published On: Jan. 2, 2013, Available at: http://www.vogella.com/tutorials/AndroidCamera/article.html.

Written Opinion dated Aug. 11, 2015 in International Patent Application No. PCT/US2014/053625, 8 pages.

International Preliminary Report on Patentability dated Nov. 19, 2015 in International Patent Application No. PCT/US2014/053625, 10 pages.

Response to Office Action dated Jan. 28, 2016 in U.S. Appl. No. 14/019,978, 11 pages.

Office Action dated Mar. 31, 2016 in U.S. Appl. No. 14/019,978, 68 pages.

\* cited by examiner

RESTRICTING INFORMATION REQUESTED BY AN APPLICATION

BACKGROUND

Computing devices may obtain information from a user that may not be intended by the user to be disseminated to others. A user may make a choice about allowing disseminating such information to others. The computing device may subsequently disseminate the information based on the user's choice. However, such a query about a choice often interrupts and/or distracts from a user's experience and may not be necessary.

Alternatively, legal notices may be posted before or during the user's experience that indicate how the information may or may not be disseminated. However, such legal notice posting also may interrupt and distract from a user's experience as well as not provide the information in the legal notice that is important or understandable in making an informed decision by a user.

SUMMARY

The technology includes a method for a computing device, such a game and media console (console), to restrict transferring information, such as a video of a user, to others on the Internet. In an embodiment, a user does not have to make a choice of having the console restrict the transferring of information to an external computing device because the technology determines that such information cannot be transferred. Accordingly, the "fun" aspect of the technology, such as playing an electronic interactive game (game), is not interfered with or interrupted in an embodiment.

When an application, such as a game, is loaded into a computing device, a Network Security Authorization list (NSAL) is read from the application to determine whether the application will communicate or connect with an external computing device. A NSAL may include authorized network addresses that an application may communicate with when executing on a computing device. When the NSAL does not include any network addresses, there is no need to obtain consent from a user regarding transferring the information externally because the application does not have the capability to do so. When one or more network addresses are includes in a NSAL, consent from a user to transfer the information externally is obtained by prompting the user. Otherwise, the information is not provided to the application without explicit consent from a user when the NSAL includes one or more network addresses.

A method embodiment of operating a computing device includes receiving information, such as a video signal. A determination is made whether an application has access to an external computing device. An indication of consent is obtained when the application has access to the external computing device. The information is provided to the application when the application does not have access to the external computing device or the indication of consent is obtained.

An apparatus embodiment comprises at least one processor readable memory that stores an application having processor readable instructions and a network address of a computing device. The processor readable memory also stores an operating system that may allow the application have access to the computing device at the network address. The processor executes the processor readable instructions of the operating system and the application to receive a video signal and determine whether the application has authorization to access the computing device at the network address. The operating system also obtains an indication of consent to output the video signal to the computing device at the network address. The video signal is then provided to the application in response to the indication of consent and determination whether the application has authorization to access the computing device at the network address.

In another embodiment, one or more processor readable memories include instructions which when executed cause one or more processors to perform a method. The method includes receiving information, accessing a signature associated with a network address and decrypting the signature to obtain a decrypted value. The decrypted value is compared with a predetermined value. An indication of consent to output the information to the network address is obtained. Information is outputted to an application in response to the comparing and the indication of consent.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
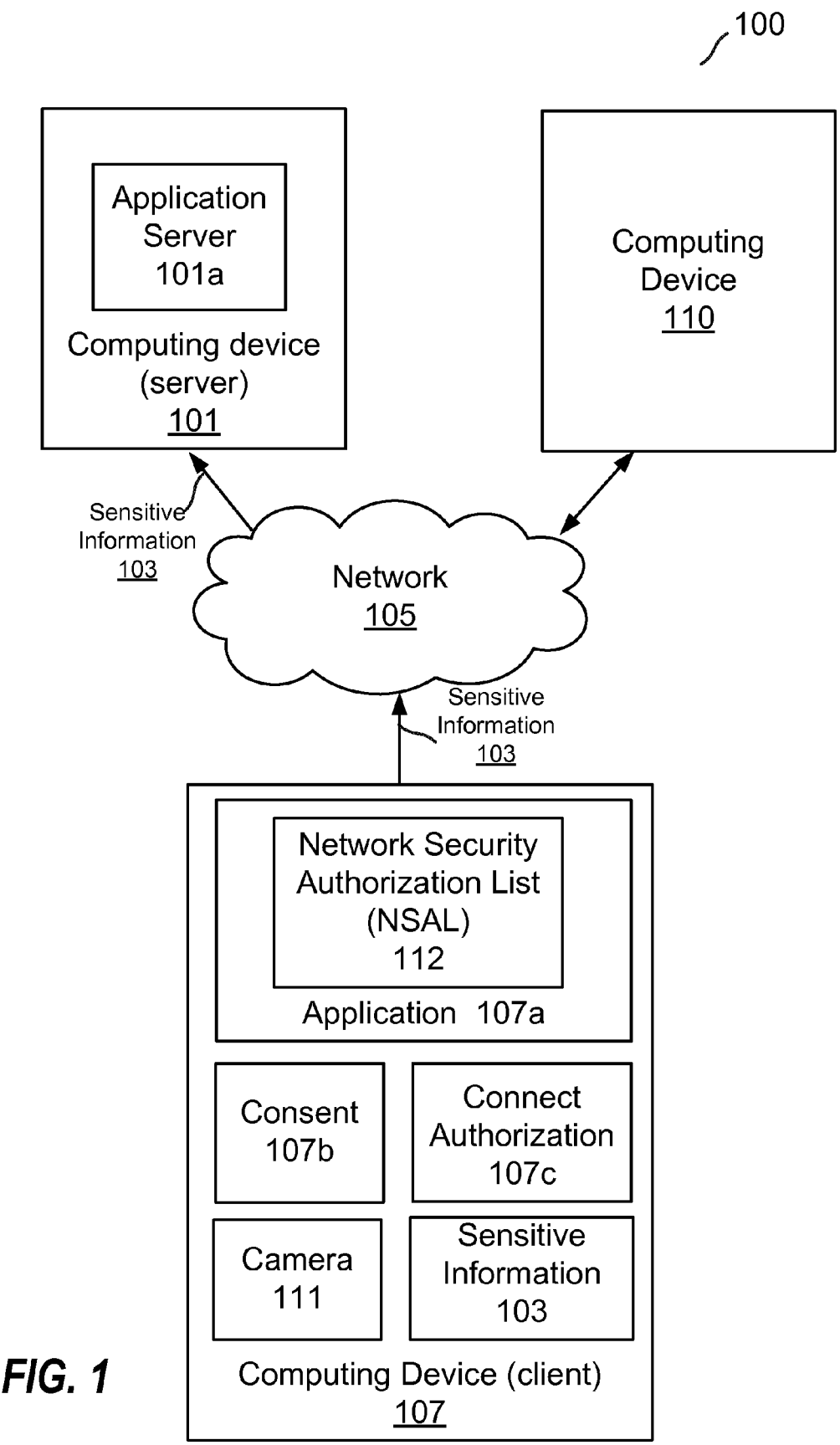
FIG. 1 is a high-level block diagram of an exemplary system architecture.

The technology includes a method for a computing device, such as a console, to restrict transferring information to others on the Internet. In an embodiment, a user does not have to make a choice of having the computing device restrict the transferring of information to an external computing device because the technology determines that such information cannot be transferred. Accordingly, the "fun" aspect of the technology, such as playing an electronic interactive game, is not interfered with or interrupted. A NSAL in an application, such as a game, is read to determine whether the application will communicate or connect with an external computing devices. A NSAL may include one or more authorized network addresses that an application may communicate with when executing on a console. When the NSAL does not include a network address, consent of the user is not necessary as the console cannot access an external computing device. When the NSAL does include a network address, consent is obtained before the application is allowed access to the information.

A computing device may store or have available information, such as sensitive information, that an application may request. For example, a live video signal from a camera in a console may be sensitive information requested by an application. An application, such as a game, may want to transfer the video signal to an external computing device for processing, such as overlaying a user's face in the video signal onto a character in the game.

A console may ask for a user's consent before making the sensitive information available to the game in order to prevent the game from transmitting the sensitive information to an external computing device contrary to a user's intentions. However, a user may not want to have to explicitly make a choice regarding transferring the information because it interferes with the "fun" aspect of gameplay.

The technology provides sensitive information to an application without risking the application "calling home" (transferring the sensitive information to an external computing device). Using NSAL, a computing device can identify classes of applications that do not have an ability to transfer sensitive information to an external computing device. A NSAL may include one or more network addresses to external computing devices stored in an application that may be accessed by an operating system. A NSAL is an agreed upon list or plurality of network addresses between the computing device developer and application developer in an embodiment. Those applications having a NSAL, which may include no network addresses, may be trusted which may provide an ease-of-use advantage for a computing device that wants to expose sensitive information to an application. Many applications may not include multiplayer gaming or advertising, so they do not need to access an external computing device.

In general, when an application loads, a computing device read the NSAL to determine what connectivity the application has with the outside world. When the NSAL is empty (no connectivity), the application can be declared safe as the application cannot communicate a user's sensitive information to the rest of the world and there is no need to interrupt a user in obtaining consent.

FIG. 1 is a high-level block diagram of a system, or apparatus 100 that determines whether an application 107a may receive sensitive information 103 without obtaining consent from a user. For example, after a determination that application 107a does not have an ability to communicate with an external computing device, such as computing device 101. Alternatively, sensitive information 103 may be provided to an application 107a when a user consents or an indication of a user's consent is obtained. In an embodiment, computing device 107 includes software components, such as application 107a (including NSAL 112), consent 107b and connect authorization 107c stored in memory of computing device 107 as described herein.

Sensitive information 103 is also stored as digital information in a memory of computing device 107. In an embodiment, sensitive information 103 may be pictures or video of one or more users. In other embodiments, sensitive information may be a user's video clip or may be metadata containing personally identifiable information such as address information or telephone number, or other information not intended by a user to be disseminated from computing device 107, singly or in combination. For example, sensitive information 103 may be a video signal from camera 111 in computing device 107. The video signal may include frames or pictures of one or more users, such as video of a user while playing a game (application 107a) on computing device 107.

In an embodiment, sensitive information 103 is not obtained from a user without explicit consent from a user. Sensitive information 103 may also be viewable by a user and may be edited by a user. In an embodiment, sensitive information 103 may also be secured by storing an encrypted version of sensitive information 103 in memory as well as allowing access to sensitive information by password.

In an embodiment, computing device 107 communicates with computing device 101 located at a remote physical location by way of network 105 as described herein. Computing device 101 is considered external to computing device 107 in an embodiment. In an embodiment, application 107a may want to transfer sensitive information 103 to computing device 101 that may provide a service. Application 107a may be a game that wants to transfer the video signal (or frame of video) to a computing device 101 for a service from application server 101a. For example, application server 101a may provide a graphics overlay service or function, such as overlaying a user's face in the video signal onto a character in the game.

In an embodiment, computing device 107 also provides sensitive information 103 to computing device 101 in response to an indication of consent by a user to allow application 107a to transfer sensitive information 103 to an external computing device, such as computing device 101. When a user explicitly communicates a consent to computing device 107 in response to query, an indication of that consent may be stored as a digital value at an address of memory in computing device 108.

In an embodiment, computing device 101 may be a server having server software components and computing device 107 may be a client of computing device 101. In another embodiment, computing devices 110 and 107 are peers. In a peer-to-peer (P2P) embodiment of computing devices 101, 107 and 110, each computing device may act as a client or a server of the other.

Computing devices 101 and 107 may communicate by way of network 105 as described herein. In further embodiments, computing device 110 communicates with computing devices 101 and 107 by way of network 105. In an embodiment, network 105 may be the Internet, a Wide Area Network (WAN) or a Local Area Network (LAN), singly or in combination. In embodiments, computing devices 101, 107 and/or 110 use one or more protocols to transfer information, such as Transmission Control Protocol/Internet Protocol (TCP/IP). In embodiments, computing device 107 is included in another network. Information may be transferred by wire and/or wirelessly in network 105.

In alternate embodiments, apparatus 100 includes many more or less computing devices and/or servers to provide and receive information. In embodiments, computing device 101, computing device 110 and/or computing device 107 corresponds to computing device 1800 having exemplary hardware components illustrated in FIG. 8 and as described herein.

Figure 6:
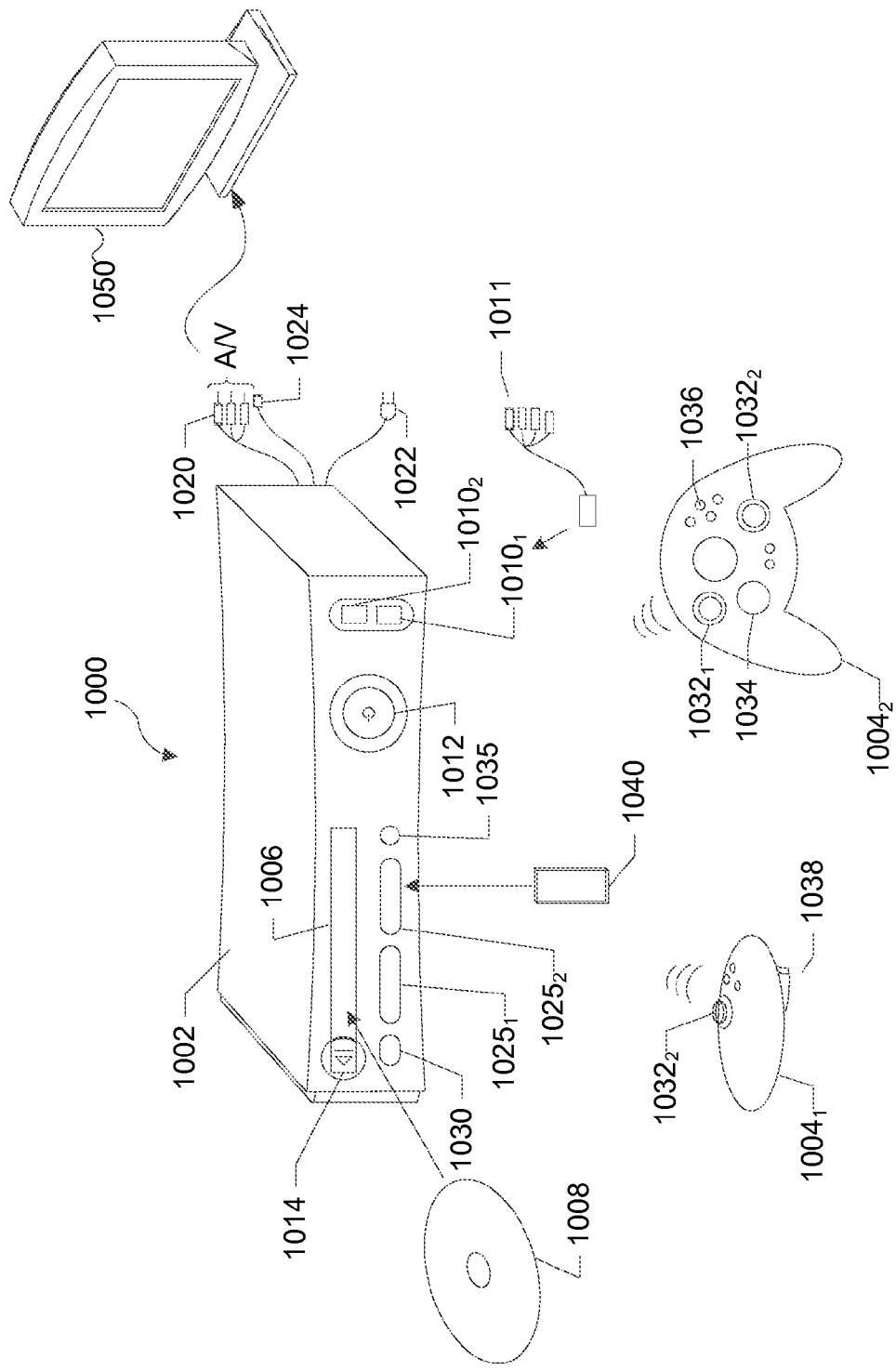
FIG. 6 is an isometric view of an exemplary gaming and media system.
Figure 7:
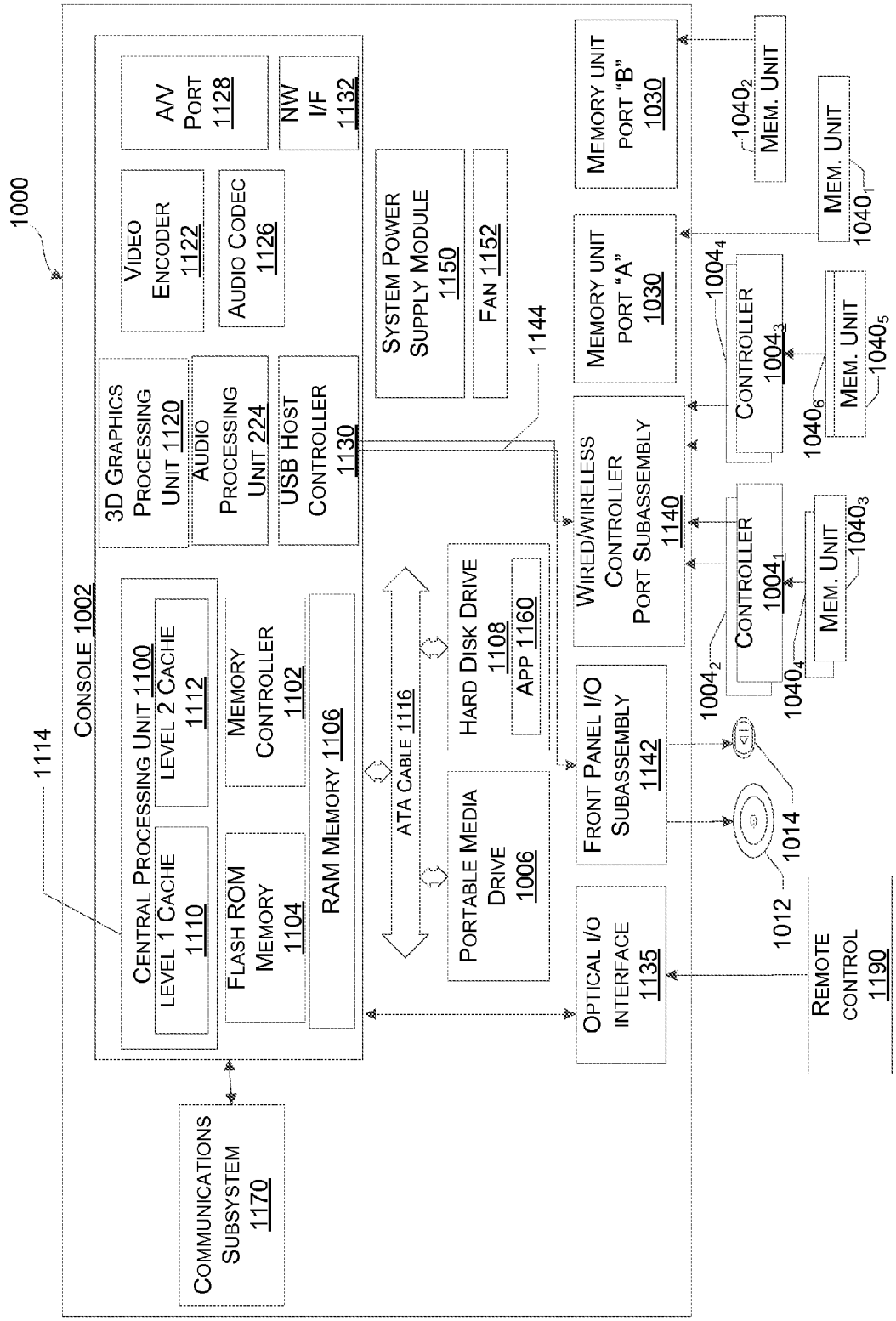
FIG. 7 is an exemplary functional block diagram of components of the gaming and media system shown in FIG. 6.
Figure 8:
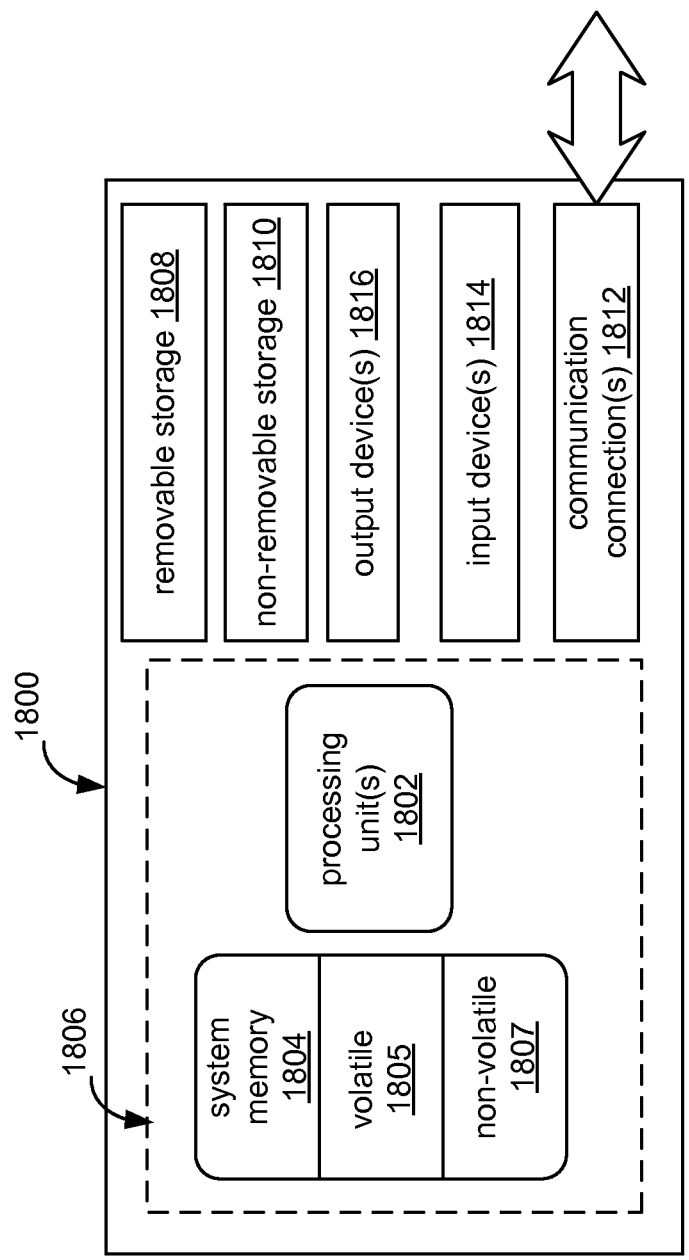
FIG. 8 is an exemplary computing device.

In an embodiment, computing device 107 is included in a console as described herein and illustrated in FIGS. 6 and 7. In an alternate embodiment, computing device 101 and/or 107 is a computing device as illustrated in FIG. 8 and described herein. In alternate embodiments, computing device 107 may be included in at least a cell phone, mobile device, embedded system, laptop computer, desktop computer, server and/or datacenter. In an embodiment, computing device 101 is a server and/or datacenter.

In embodiments, computing devices 101, 107 and 110 include one or more processor readable memories to store digital information and/or software components having processor readable instructions as described herein. In embodiments, computing device 101, 107 and 110 include one or more processors to execute or read the processor readable instructions and read the digital information.

Figure 2:
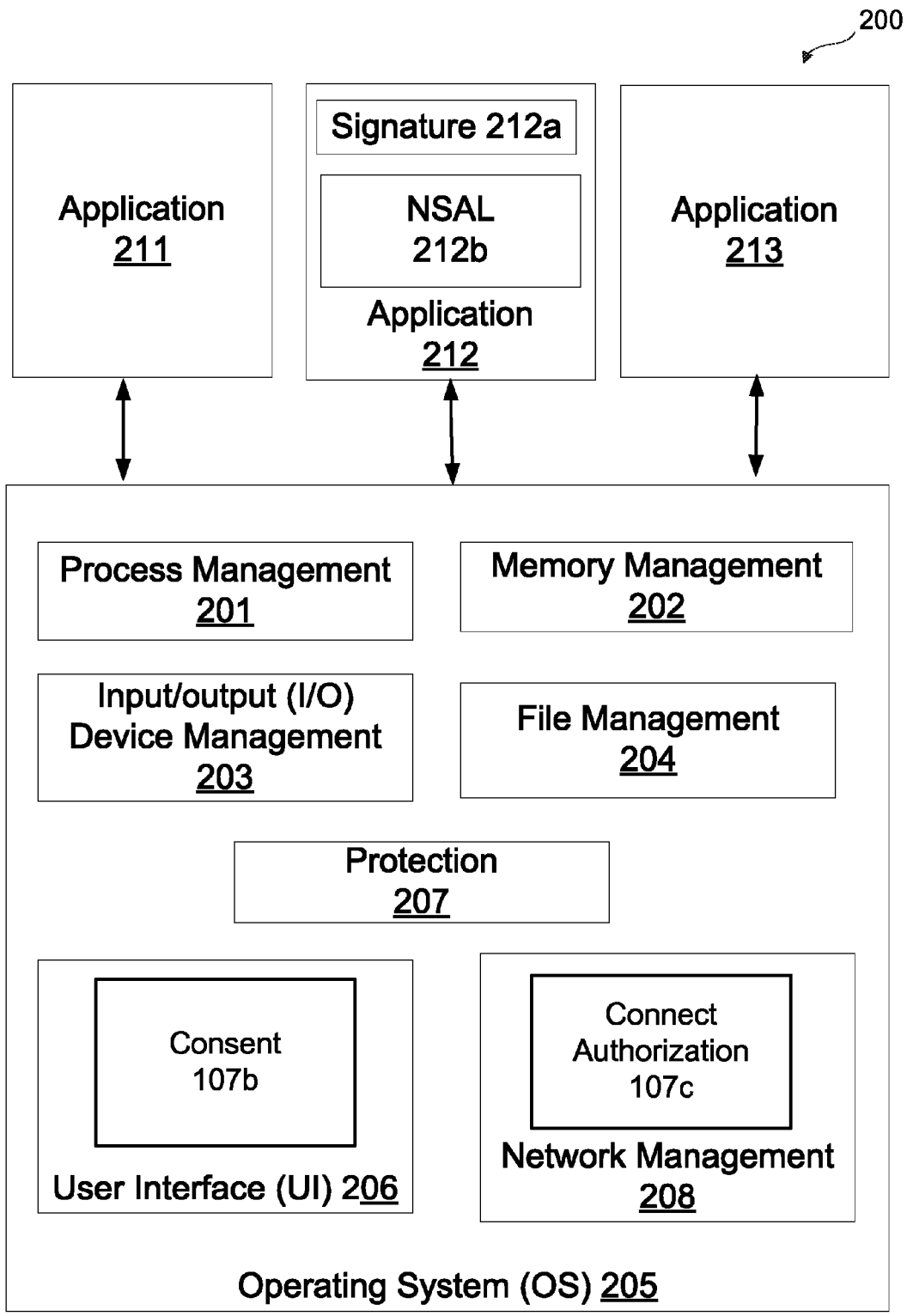
FIG. 2 is a high-level block diagram of an exemplary software architecture.

FIG. 2 is a high-level block diagram of an exemplary software architecture 200 that determines whether an application, such as applications 211-213 may receive sensitive information 103 without obtaining consent from a user. Operating System (OS) 205 includes consent 107*b* and connect authorization 107*c* to determine whether an application may transfer sensitive information 103 to an external computing device. In an embodiment, connect authorization 107*c* in network management 208 reads a NSAL 212*b* and signature 212*a* of application 212 in order to determine whether application 212 may receive sensitive information 103. In an alternate embodiment, consent 107*b* in UI 206 obtains and stores an indication of consent (as a digital value) from a user to transfer sensitive information 103 to application 212. In embodiments, an indication of consent may include a consent to transfer the sensitive information 103 to an application 212 or a denial of consent to transfer the sensitive information 103 to an application 212. In an embodiment, applications 211-213 may include one or more electronic interactive games.

In an embodiment, OS 205 and applications 211-213 includes one or more of software components. In an embodiment, a software component may include a software program, software object, software function, software subroutine, software method, software instance, script and/or a code fragment, singly or in combination. For example, OS 205 includes one or more of user interface (UI) 206, process management 201, memory management 202, input/output (I/O) device management 203, file management 204, network management 208 and protection 207. One or more exemplary functions that may be performed by the various OS software components are described below. In alternate embodiment, more or less software components and/or functions of the software components described below may be used.

In embodiments, at least portions of OS 205 are stored in one or more processor readable memories. In an embodiment, at least portions of OS 205 are stored in processor readable memories of computing device 107 illustrated in FIG. 1.

Processes management 201 is responsible for creating and deleting user and system processes. Process management 201 may also be responsible for suspension and resumption of processes. Process management 201 is also responsible for synchronization and communication of processes. Process management 201 is also responsible for deadlock handling.

Memory management 202 is responsible for keeping track of which part of memory in the different types of memory is currently being used by a particular software component or application. Memory management 202 also decides which processes are loaded into memory when memory space becomes available. Memory management also allocates and deallocates memory space as needed.

Input/output (I/O) device management 203 is responsible for managing I/O devices. For example, I/O device management 203 manages camera 111 that provides a video signal. In an embodiment, the peculiarities of specific hardware are hidden from users. In an embodiment, device drivers know the peculiarities of the specific device. For example, I/O device management 203 may be responsible for disk management functions such as free space management, memory allocation, fragmentation, removal and head scheduling.

File management 204 is responsible for creating and deleting files and directories. File management 204 may support a hierarchical file system. File management 204 may also back up files onto secondary memory.

Network management 208 is responsible for communication with networks including providing connection/routing methods. Network management 208 may also be responsible for data/process migration to other computing devices. In an embodiment, network management includes connect authorization 107*c* to enable or disable a connection or access to one or more external computing devices as described herein.

Protection 207 is responsible for controlling access of software components, processes, and/or users to resources of the computing device. For example, protection 207 is responsible for controlling access to resources such as central processing unit (CPU), cycles, memory, files, and/or I/O devices. Protection 207 is also responsible for user authentication and communication.

User interface (UI) 206 provides a speech, natural language, character and/or graphics user interface to a user and is responsible for receiving input and providing output to a user. In an embodiment, UI 206 includes consent 107*b* that is responsible for obtaining and storing an indication of consent from a user as a digital value at an address of a memory in computing device 107.

In a console embodiment as illustrated in FIGS. 6 and 7, a user may enter input to console 1002 by way of gesture, touch or voice. In an embodiment, optical I/O interface 1135 receives and translates gestures of a user. In an embodiment, console 1002 includes a natural user interface (NUI) as user interface 206 to receive and translate voice and/or gesture inputs from a user. In an embodiment, front panel subassembly 1142 includes a touch surface and a microphone for receiving and translating a user's touch or voice, such as a user's consent, as described in detail herein. In an embodiment, user interface 206 translates spoken consent from a user provided to a microphone of console 1002 from one or more users. In an embodiment, UI 206 includes a NUI that outputs a voice asking for consent from a user and interprets a spoken answer from the user, such as consent or denial. The spoken answer, such as consent, may then be stored in memory as an indication of consent.

Figure 3:
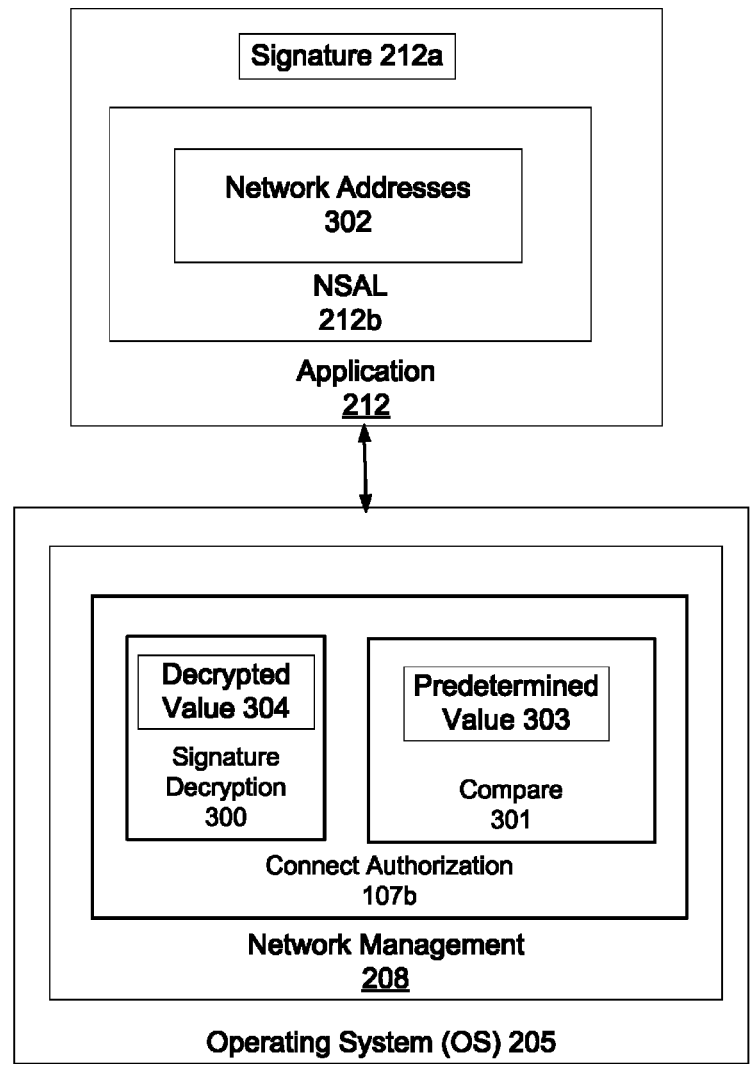
FIG. 3 is high-level block diagram of an exemplary network management software component in an exemplary operating system and application.

FIG. 3 is high-level block diagram of connect authorization 107*b* in an exemplary OS 205 and application 212 including NSAL 212*b* having network addresses (if any). In an embodiment, connect authorization 107*b* uses signature decryption 300, signature 212*a* and compare 301 with predetermined value 303 to ensure that a network address (if any) stored in application 212 is authorized and authentic.

Signature decryption 300 is responsible for decrypting signature 212*a* that may be associated with one or more network addresses in network addresses 302 of NSAL 212*b*. In an embodiment, there may be a single or multiple signature(s) associated with network addresses 302. Signature decryption 300 decrypts signature 212*a* into a decrypted value 304. Once a network address for an application to access has been approved or authorized an encrypted value or signature 212a is provided to an application developer to code, or include in processor readable instructions, with the authorized network address.

Connect authorization 107c then uses compare 301 to compare the decrypted value 304 from signature decryption 300 with a stored predetermined value 303 stored in compare 301. In an embodiment, values described herein may be single or multi-bit digital values. When decrypted value 304 matches predetermined value 303 by compare 301, a determination is made that the network address stored in application 212 is authorized and may be accessed (when a user consents in embodiments described herein).

In alternate embodiments, a signature 212a is not used and compare 301 compares network addresses in network addresses 302 with a predetermined list of authorized network addresses stored in compare 301.

Figure 4:
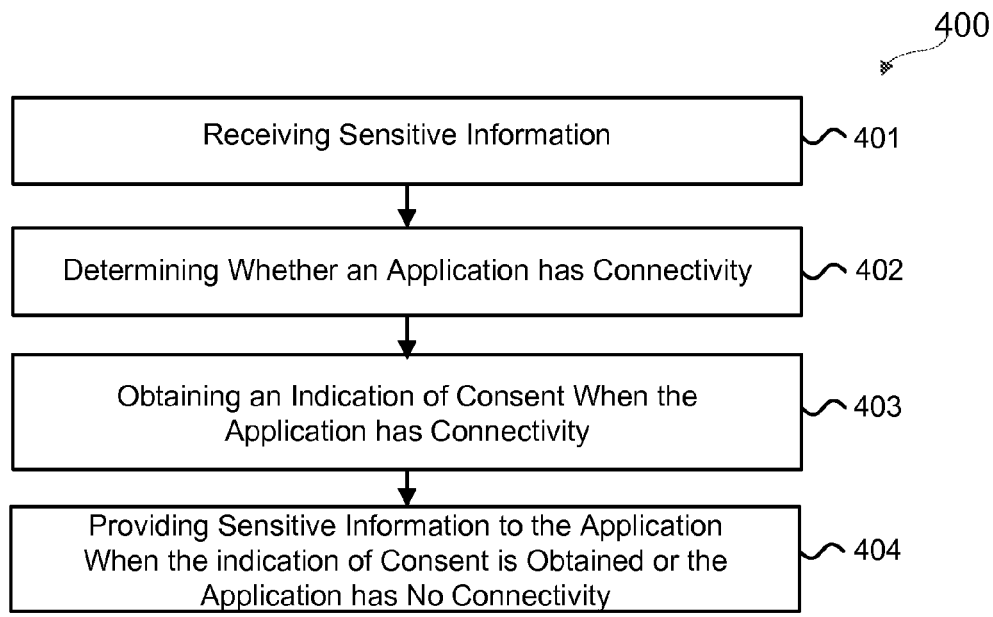
FIG. 4 is a flow chart of an exemplary method to provide information to an application that transfers the information to an external computing device.
Figure 5A:
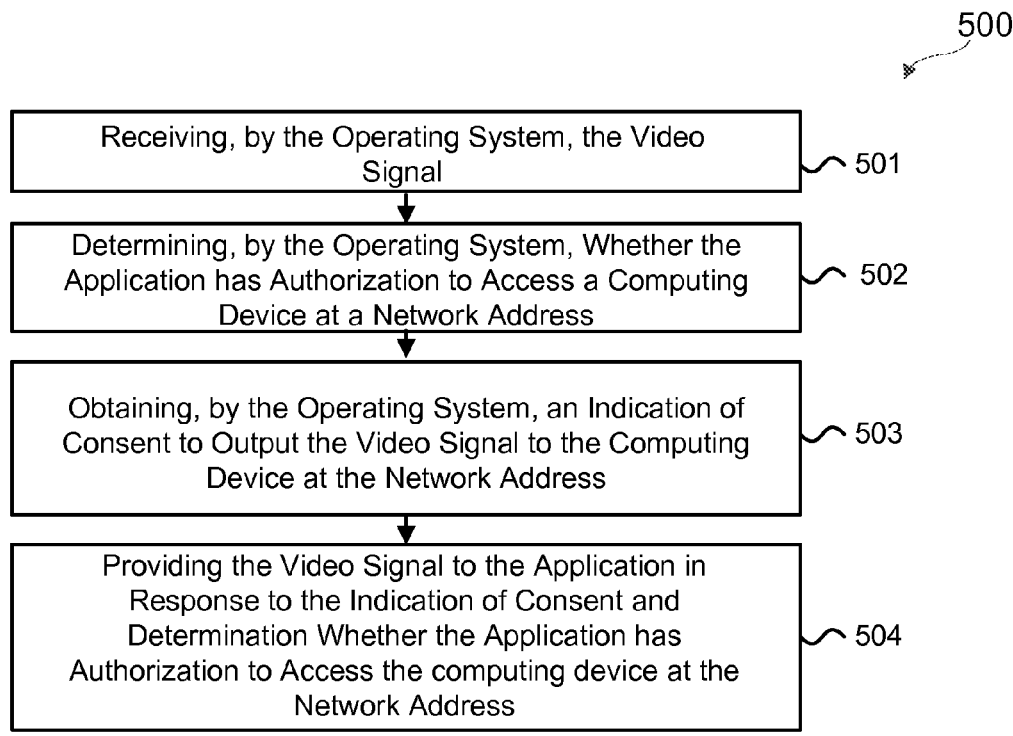
FIG. 5A is a flow chart of an exemplary method to provide a video signal to an application that transfers the video signal to an external computing device.
Figure 5B:
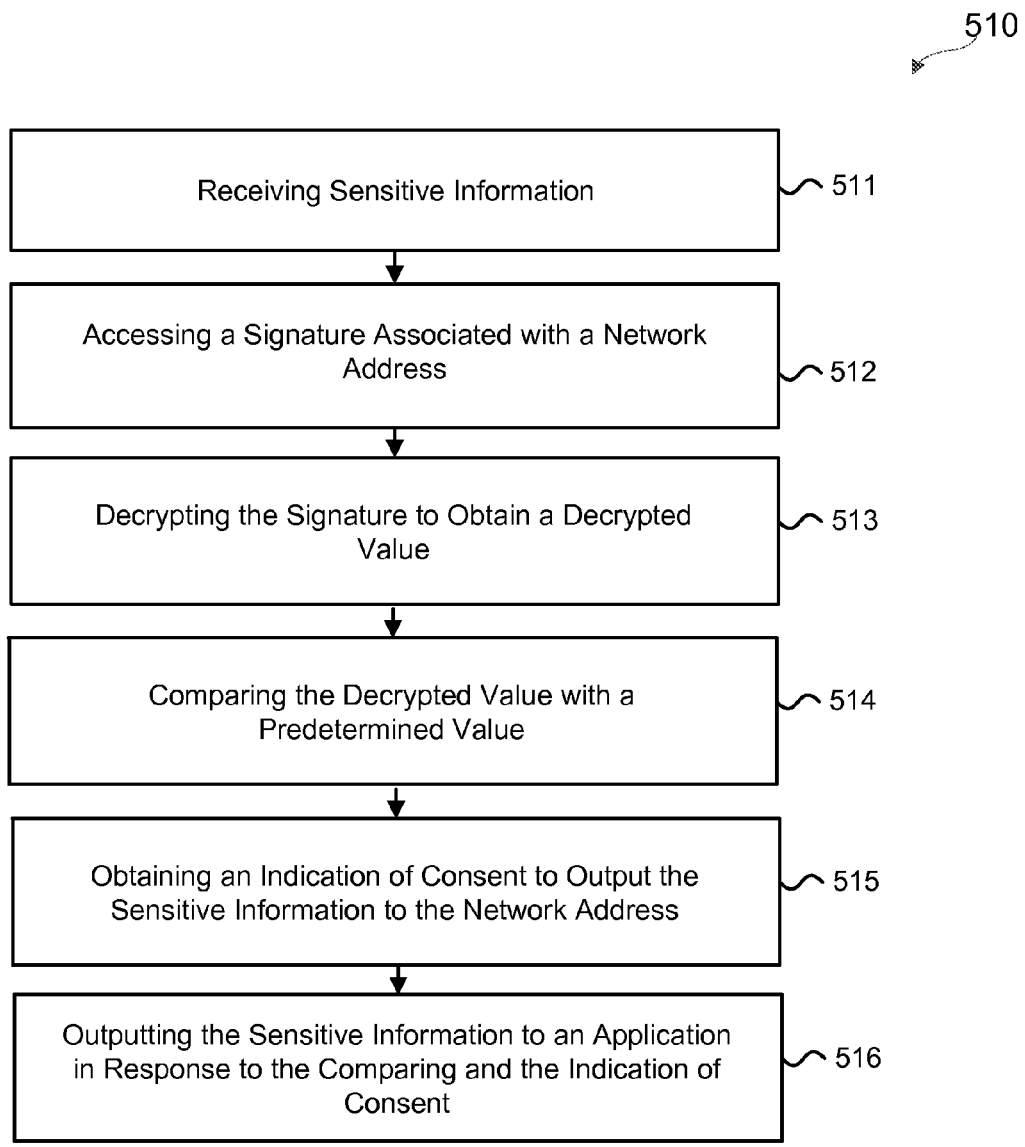
FIG. 5B is a flow chart of an exemplary method to provide information to an application in response to validating an electronic signature associated with a network address to an external computing device or obtaining an indication of consent from a user.

FIGS. 4-5B are flow charts illustrating exemplary methods that determines whether an application may receive information without obtaining consent from a user. In embodiments, steps illustrated in FIGS. 4-5B represent the operation of hardware (e.g., processor, memory, circuits), software (e.g., OS, applications, drivers, machine/processor executable instructions), or a user, singly or in combination. As one of ordinary skill in the art would understand, embodiments may include less or more steps shown.

FIG. 4 is a flow chart of an exemplary method 400 to provide information, such as sensitive information 103, to an application that transfers the sensitive information to an external computing device. In an embodiment, method 400 is performed by computing device 107, in particular at least consent 107b and connect authorization 107c are used, as illustrated in FIG. 1.

Step 401 illustrates receiving information, such as sensitive information. In an embodiment, OS 205 receives or has access to sensitive information 103 as illustrated in FIGS. 1 and 2

Step 402 illustrates determining whether an application has connectivity to external computing devices. In an embodiment, connect authorization 107c reads NSAL 212b and signature 212a when application 212 is loaded to determine whether application 212 has one or more network addresses in NSAL 212b to transfer information to an external computing device, such as computing device 101

Step 403 illustrates obtaining an indication of consent from a user when the application has connectivity to an external computing device. In an embodiment, when connect authorization 107c determines one or more network addresses are stored in NSAL 212a and application 212 has the ability to transfer information externally, an indication of consent from a user is obtained. In an embodiment, consent 107b in UI 206 obtains an indication of consent from a user to allow the application to transfer sensitive information. Consent 107b also stores the indication of consent as a digital value at an address in a memory of computing device 107 in an embodiment. In embodiments, an indication of consent may be obtained by a selection of a menu item by a user or a user verbally consenting in response to a verbal or spoken question by a NUI.

Step 404 illustrates providing information, such as sensitive information, to the application when consent has been obtained from a user or an application has no connectivity, or no access to an external computing device. In an embodiment, OS 205 provides sensitive information 103 to application 212 when either connect authorization 107c determines application 212 does not have a network address in NSAL 212b or an indication of consent from a user to transfer the sensitive information 103 to application 212 is stored in consent 107b.

In other embodiments, steps 401-404 are performed by at least exemplary software components and hardware shown in FIGS. 1-3 and 6-8. For example, method 400 may be performed by console 1002 illustrated in FIGS. 6-7 or computing device 1800 illustrated in FIG. 8.

FIG. 5A is a flow chart of an exemplary method 500 to provide information, such as a video signal, to an application that transfers the video signal. In an embodiment, method 500 is performed by computing device 107, in particular at least consent 107b and connect authorization 107c are used, as illustrated in FIG. 1.

Step 501 illustrates receiving, by the operating system, a video signal as sensitive information. In an embodiment, the operating system corresponds to operating system 205 illustrated in FIG. 2.

Step 502 illustrates determining, by the operating system, whether the application has authorization to access a network address. In an embodiment, connect authorization 107c reads NSAL 212b and signature 212a when application 212 is loaded to determine whether application 212 has one or more network addresses in NSAL 212b to transfer information to an external computing device, such as computing device 101

Step 503 illustrates obtaining, by the operating system, an indication of consent to output the video signal to the network address. In an embodiment, when connect authorization 107c determines one or more network addresses are stored in NSAL 212a and application 212 has the ability to transfer information externally, an indication of consent from a user is obtained. In an embodiment, an indication of consent of the user is obtained as described herein.

Step 504 illustrates providing the video signal to the application in response to the indication of consent and determination whether the application has authorization to access the network address. In an embodiment, OS 205 provides a video signal of a user to application 212 when either connect authorization 107c determines application 212 does not have a network address in NSAL 212b or an indication of consent from a user to transfer the video signal to application 212 is stored in consent 107b.

In other embodiments, steps 501-504 are performed by at least exemplary software components and hardware shown in FIGS. 1-3 and 6-8. For example, method 500 may be performed by console 1002 illustrated in FIGS. 6-7 or computing device 1800 illustrated in FIG. 8.

FIG. 5B is a flow chart of an exemplary method 510 to provide information, such as sensitive information, to an application in response to validating an electronic signature associated with a network address to an external computing device or obtaining an indication of consent from a user.

Step 511 illustrates receiving information, such as sensitive information 103 illustrated in FIG. 1 and described herein. In an embodiment, an operating system, such as OS 205 accesses, receives or controls the sensitive information until releasing or transferring the sensitive information to a requesting application, such as application 212. In an embodiment, a camera 111 provides a video signal that is received by computing device 107 as illustrated in FIG. 1.

Step 512 illustrates accessing a signature associated with a network address. In embodiments, a NSAL or a NSAL in an application (such as NSAL 212b shown in FIGS. 2 and 3) that request sensitive information is accessed. In particular, a signature 212a, or encrypted code having a multi-bit digital value associated with a network address of an external computing device in a NSAL 212*b* is accessed. In an embodiment, signature decryption 300 access one or more signatures 212*a* associated with one or more network addresses 302 in NSAL 212*b*. In an embodiment, each network address in NSAL 212*b* has an associated signature.

Step 513 illustrates decrypting a signature, such as signature 212*a*, to obtain a decrypted value 304 or code. In an embodiment, signature decryption 300 in connect authorization 107*c*, as illustrated in FIG. 3, executed by one or more processors performs this function.

Step 514 illustrates comparing the decrypted value from a signature, such as decrypted value 304, with a predetermined value, such as a predetermined value 303. In embodiments, decrypted value 304 and predetermined value 304 are multi-bit digital values stored in memory of computing device 107. In an embodiment, compare 301 executed by one or more processors in computing device 107 performs this function. When compare 301 determines that the decrypted value 304 and predetermined value 303 match or are identical, one or more network addresses in network addresses 302 are validated. In other words, compare determines whether an application may access an external computing device at the one or more network address of the associated signature 212*a*. When no network address is in network addresses 302, consent of a user is not obtained as the requesting application does not have access to an external computing device. Accordingly, step 515 is skipped when no network address is in network addresses 302.

Step 515 illustrates obtaining an indication of consent to output the sensitive information to the computing device at the network address. In an embodiment, consent 107*b* in UI 206 performs this function similarly as described herein. In particular, consent from a user is obtained when compare 301 determines an application has a valid network address in NSAL 212*b*.

Step 516 illustrates outputting the sensitive information to an application in response to the comparing and the indication of consent. In an embodiment, OS 205 allows application 212 access to sensitive information 103 when no network address is in NSAL 212*b* (step 514 in an embodiment) or an indication of consent from a user is obtained (step 515 in an embodiment).

In other embodiments, steps 511-516 are performed by at least exemplary software components and hardware shown in FIGS. 1-3 and 6-8. For example, method 510 may be performed by console 1002 illustrated in FIGS. 6-7 or computing device 1800 illustrated in FIG. 8.

In an embodiment, computing device 107 may be, but is not limited to, a video game and/or media console. FIG. 6 will now be used to describe an exemplary video game and media console, or more generally, will be used to describe an exemplary gaming and media system 1000 that includes a game and media console. The following discussion of FIG. 6 is intended to provide a brief, general description of a suitable computing device with which concepts presented herein may be implemented. It is understood that the system of FIG. 6 is by way of example only. In further examples, embodiments describe herein may be implemented using a variety of client computing devices, either via a browser application or a software application resident on and executed by the client computing device. As shown in FIG. 6, a gaming and media system 1000 includes a game and media console (hereinafter "console") 1002. In general, the console 1002 is one type of client computing device. The console 1002 is configured to accommodate one or more wireless controllers, as represented by controllers $1004_1$ and $1004_2$. The console 1002 is equipped with an internal hard disk drive and a portable media drive 1006 that support various forms of portable storage media, as represented by an optical storage disc 1008. Examples of suitable portable storage media include DVD, CD-ROM, game discs, and so forth. The console 1002 also includes two memory unit card receptacles $1025_1$ and $1025_2$, for receiving removable flash-type memory units 1040. A command button 1035 on the console 1002 enables and disables wireless peripheral support.

As depicted in FIG. 6, the console 1002 also includes an optical port 1030 for communicating wirelessly with one or more devices and two USB ports $1010_1$ and $1010_2$ to support a wired connection for additional controllers, or other peripherals. In some implementations, the number and arrangement of additional ports may be modified. A power button 1012 and an eject button 1014 are also positioned on the front face of the console 1002. The power button 1012 is selected to apply power to the game console, and can also provide access to other features and controls, and the eject button 1014 alternately opens and closes the tray of a portable media drive 1006 to enable insertion and extraction of an optical storage disc 1008.

The console 1002 connects to a television or other display (such as display 1050) via A/V interfacing cables 1020. In one implementation, the console 1002 is equipped with a dedicated A/V port configured for content-secured digital communication using A/V cables 1020 (e.g., A/V cables suitable for coupling to a High Definition Multimedia Interface "HDMI" port on a high definition display 1050 or other display device). A power cable 1022 provides power to the console 1002. Console 1002 may be further configured with broadband capabilities, as represented by a cable or modem connector 1024 to facilitate access to a network, such as the Internet. The broadband capabilities can also be provided wirelessly, through a broadband network such as a wireless fidelity (Wi-Fi) network.

Each controller 1004 is coupled to the console 1002 via a wired or wireless interface. In the illustrated implementation, the controllers 1004 are USB-compatible and are coupled to the console 1002 via a wireless or USB port 1010. The console 1002 may be equipped with any of a wide variety of user interaction mechanisms. In an example illustrated in FIG. 6, each controller 1004 is equipped with two thumb sticks $1032_1$ and $1032_2$, a D-pad 1034, buttons 1036, and two triggers 1038. These controllers are merely representative, and other known gaming controllers may be substituted for, or added to, those shown in FIG. 6.

In an embodiment, a user may enter input to console 1002 by way of gesture, touch or voice. In an embodiment, optical I/O interface 1135 receives and translates gestures of a user. In an embodiment, optical I/O interface includes a camera to obtain a video signal, of for example users. In another embodiment, console 1002 includes a NUI to receive and translate voice and gesture inputs from a user. In an alternate embodiment, front panel subassembly 1142 includes a touch surface and a microphone for receiving and translating a touch or voice, such as consent of a user. In an embodiment front panel subassembly 1142 includes a speaker to ask a user for an indication of consent (or denial) to allow sensitive information to be communicated to external computing devices.

In an embodiment, multiple microphones 1011 may be plugged into a USB port 1010 to provide a four channel signal representing a user's speech. In alternate embodiments, a single microphone may be used. In an embodiment, four 16 kHz 24 bit audio signals are provided from multiple microphones 1011 to USB port 1010 and at least one audio pipeline. In an embodiment, the at least one audio pipeline reduces noise associated with the at least one audio signal, such as other users speaking or audio from an electronic interactive game application.

In one implementation, a memory unit (MU) 1040 may also be inserted into the controller 1004 to provide additional and portable storage. Portable MUs enable users to store game parameters for use when playing on other consoles. In this implementation, each controller is configured to accommodate two MUs 1040, although more or less than two MUs may also be employed.

The gaming and media system 1000 is generally configured for playing games stored on a memory medium, as well as for downloading and playing games, and reproducing pre-recorded music and videos, from both electronic and hard media sources. With the different storage offerings, titles (or applications) can be played from the hard disk drive, from an optical storage disc media (e.g., 1008), from an online source, or from MU 1040. Samples of the types of media that gaming and media system 1000 is capable of playing include:

Game titles or applications played from CD, DVD or higher capacity discs, from the hard disk drive, or from an online source.

Digital music played from a CD in portable media drive 1006, from a file on the hard disk drive or solid state disk, (e.g., music in a media format), or from online streaming sources.

Digital audio/video played from a DVD disc in portable media drive 1006, from a file on the hard disk drive (e.g., Active Streaming Format), or from online streaming sources.

During operation, the console 1002 is configured to receive input from controllers 1004 and display information on the display 1050. For example, the console 1002 can display a user interface on the display 1050 to allow a user to select an electronic interactive game using the controller 1004 and display state solvability information. In an embodiment, console 1002 provides a menu to display 1050 to enable a selection of consent (or denial) by controllers 1004 to allow sensitive information to be communicated to external computing devices. In embodiments, a menu may be very broad such as not consenting or consenting to transferring any sensitive information from any application. Alternatively, the menu may allow a user to select or consent to particular information that may be transferred by a particular application. For example, a menu may allow a user to consent to a video signal to be transferred from a game, but the game may not transfer credit card information.

FIG. 7 is a functional block diagram of the gaming and media system 1000 and shows functional components of the gaming and media system 1000 in more detail. The console 1002 has a CPU 1100, and a memory controller 1102 that facilitates processor access to various types of memory, including a flash ROM 1104, a RAM 1106, a hard disk drive or solid state drive 1108, and the portable media drive 1006. In alternate embodiments, other types of volatile and non-volatile memory technologies may be used. In one implementation, the CPU 1100 includes a level 1 cache 1110 and a level 2 cache 1112, to temporarily store data and hence reduce the number of memory access cycles made to the hard drive 1108, thereby improving processing speed and throughput.

The CPU 1100, the memory controller 1102, and various memories are interconnected via one or more buses. The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 1100, the memory controller 1102, the ROM 1104, and the RAM 1106 are integrated onto a common module 1114. In this implementation, the ROM 1104 is configured as a flash ROM that is connected to the memory controller 1102 via a PCI bus and a ROM bus (neither of which are shown). The RAM 1106 is configured as multiple Double Data Rate Synchronous Dynamic RAM (DDR SDRAM) or faster data rate DRAM modules that are independently controlled by the memory controller 1102 via separate buses. The hard disk drive 1108 and the portable media drive 1006 are shown connected to the memory controller 1102 via the PCI bus and an AT Attachment (ATA) bus 1116. However, in other implementations, dedicated data bus structures of different types can also be applied in the alternative.

In another embodiment, at least CPU 1100, level 1 cache 1110, level 2 cache 1112, memory controller 1102 and RAM memory 1106 are included in a System on a Chip (SoC). In an embodiment, CPU 1100 is replaced with processor cores. In an embodiment, RAM memory 1106 is replaced with high performance memory, such as Wide I/O DRAM and the function of memory controller 1102 is performed by processor cores. Another type of memory that is not high performance memory, such as LPDDR3 DRAM, may be coupled to a SoC in an embodiment.

A SoC (a.k.a. SOC) is an integrated circuit (IC) that integrates electronic components and/or subsystems of a computing device or other electronic system into a single semiconductor substrate and/or single chip housed within a single package. For example, memory that was previously in a memory module subsystem in a personal computer (PC) may now be included in a SoC. Similarly, memory control logic may be included in a processor of a SoC rather than in a separately packaged memory controller.

As one of ordinary skill in the art would appreciate, other electronic components may be included in a SoC. A SoC may include digital, analog, mixed-signal, and/or radio frequency circuits—one or more on a single semiconductor substrate. A SoC may include oscillators, phase-locked loops, counter-timers, real-time timers, power-on reset generators, external interfaces (for example, Universal Serial Bus (USB), IEEE 1394 interface (FireWire), Ethernet, Universal Asynchronous Receiver/Transmitter (USART) and Serial Peripheral Bus (SPI)), analog interfaces, voltage regulators and/or power management circuits.

In alternate embodiments, a SoC may be replaced with a system in package (SiP) or package on package (PoP). In a SiP, multiple chips or semiconductor substrates are housed in a single package. In a SiP embodiment, processor cores would be on one semiconductor substrate and high performance memory would be on a second semiconductor substrate, both housed in a single package. In an embodiment, the first semiconductor substrate would be coupled to the second semiconductor substrate by wire bonding.

In a PoP embodiment, processor cores would be on one semiconductor die housed in a first package and high performance memory would be on a second semiconductor die housed in a second different package. The first and second packages could then be stacked with a standard interface to route signals between the packages, in particular the semiconductor dies. The stacked packages then may be coupled to a printed circuit board having memory additional memory as a component in an embodiment.

In embodiments, processor cores includes multiple processors that executes (or reads) processor (or machine) readable instructions stored in processor readable memory. An example of processor readable instructions may include an OS and/or an application for computing device 107 (such as OS 205 and applications 211-213 shown in FIG. 2). Processor cores may use high performance memory and additional memory in response to executing processor readable instructions of an OS and application. In an embodiment, processor cores may include a processor and memory controller or alternatively a processor that also performs memory management functions similarly performed by a memory controller. Processor cores may also include a controller, graphics-processing unit (GPU), digital signal processor (DSP) and/or a field programmable gate array (FPGA). In an embodiment, high performance memory is positioned on top of a processor cores.

In embodiments, high performance memory and additional memory are include in one or more arrays of memory cells in an IC disposed on separate semiconductor substrates. In an embodiment, high performance memory and additional memory are included in respective integrated monolithic circuits housed in separately packaged devices. In embodiments, high performance memory and additional memory may include volatile and/or non-volatile memory.

Types of volatile memory include, but are not limited to, dynamic random access memory (DRAM), molecular charge-based (ZettaCore) DRAM, floating-body DRAM and static random access memory ("SRAM"). Particular types of DRAM include double data rate SDRAM ("DDR"), or later generation SDRAM (e.g., "DDRn").

Types of non-volatile memory include, but are not limited to, types of electrically erasable program read-only memory ("EEPROM"), FLASH (including NAND and NOR FLASH), ONO FLASH, magneto resistive or magnetic RAM ("MRAM"), ferroelectric RAM ("FRAM"), holographic media, Ovonic/phase change, Nano crystals, Nanotube RAM (NRAM-Nantero), MEMS scanning probe systems, MEMS cantilever switch, polymer, molecular, nano-floating gate and single electron.

A three-dimensional graphics processing unit 1120 and a video encoder 1122 form a video processing pipeline for high speed and high resolution (e.g., High Definition) graphics processing. Data are carried from the graphics processing unit 1120 to the video encoder 1122 via a digital video bus. An audio processing unit 1124 and an audio codec (coder/decoder) 1126 form a corresponding audio processing pipeline for multi-channel audio processing of various digital audio formats. Audio data are carried between the audio processing unit 1124 and the audio codec 1126 via a communication link. The video and audio processing pipelines output data to an A/V (audio/video) port 1128 for transmission to a television or other display.

FIG. 7 shows the module 1114 including a USB host controller 1130 and a network interface 1132. The USB host controller 1130 is shown in communication with the CPU 1100 and the memory controller 1102 via a bus (e.g., PCI bus) and serves as host for the peripheral controllers $1004_1$-$1004_4$. The network interface 1132 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 7, the console 1002 includes a controller support subassembly 1140 for supporting the four controllers $1004_1$-$1004_4$. The controller support subassembly 1140 includes any hardware and software components to support wired and wireless operation with an external control device, such as for example, a media and game controller. A front panel I/O subassembly 1142 supports the multiple functionalities of power button 1012, the eject button 1014, as well as any LEDs (light emitting diodes) or other indicators exposed on the outer surface of console 1002. Subassemblies 1140 and 1142 are in communication with the module 1114 via one or more cable assemblies 1144. In other implementations, the console 1002 can include additional controller subassemblies. The illustrated implementation also shows an optical I/O interface 1135 that is configured to send and receive signals that can be communicated to the module 1114.

The MUs $1040_1$ and $1040_2$ are illustrated as being connectable to MU ports "A" $1030_1$ and "B" $1030_2$ respectively. Additional MUs (e.g., MUs $1040_3$-$1040_6$) are illustrated as being connectable to the controllers $1004_1$ and $1004_3$, i.e., two MUs for each controller. The controllers $1004_2$ and $1004_4$ can also be configured to receive MUs. Each MU 1040 offers additional storage on which electronic interactive games, game parameters, and other data may be stored. In some implementations, the other data can include any of a digital game component, an executable gaming application, an instruction set for expanding a gaming application, and a media file. When inserted into the console 1002 or a controller, the MU 1040 can be accessed by the memory controller 1102.

A system power supply module 1150 provides power to the components of the gaming system 1000. A fan 1152 cools the circuitry within the console 1002.

An application 1160 comprising processor readable instructions is stored on the hard disk drive 1108. When the console 1002 is powered on, various portions of the application 1160 are loaded into RAM 1106, and/or caches 1110 and 1112, for execution on the CPU 1100, wherein the application 1160 is one such example. Various applications can be stored on the hard disk drive 1108 for execution on CPU 1100. In an embodiment, application 1160 corresponds to one of applications 211-213 shown in FIG. 2, as described herein.

The console 1002 is also shown as including a communication subsystem 1170 configured to communicatively couple the console 1002 with one or more other computing devices (e.g., other consoles). The communication subsystem 1170 may include wired and/or wireless communication devices compatible with one or more different communication protocols. As non-limiting examples, the communication subsystem 1170 may be configured for communication via a wireless telephone network, or a wired or wireless local- or wide-area network. In some embodiments, the communication subsystem 1170 may allow the console 1002 to send and/or receive messages to and/or from other devices via a network such as the Internet. In specific embodiments, the communication subsystem 1170 can be used to communicate with a coordinator and/or other computing devices, for sending download requests, and for effecting downloading and uploading of digital content. More generally, the communication subsystem 1170 can enable the console 1002 to participate on peer-to-peer communications.

The gaming and media system 1000 may be operated as a standalone system by simply connecting the system to display 1050 (FIG. 6), a television, a video projector, or other display device. In this standalone mode, the gaming and media system 1000 enables one or more players to play electronic interactive games, or enjoy digital media, e.g., by watching movies, or listening to music. However, with the integration of broadband connectivity made available through network interface 1132, or more generally the communication subsystem 1170, the gaming and media system 1000 may further be operated as a participant in a larger network gaming community, such as a peer-to-peer network.

The above described console 1002 is just one example of a computing device 107 discussed above with reference to FIG. 1 and various other Figures. As was explained above, there are various other types of computing devices with which embodiments described herein can be used.

FIG. 8 is a block diagram of one embodiment of a computing device 1800 (which may correspond to computing device 107 shown in FIG. 1) which may host at least some of the software components illustrated in FIGS. 1-3. In its most basic configuration, computing device 1800 typically includes one or more processing units/cores 1802 including one or more CPUs and one or more GPUs. Computing device 1800 also includes system memory 1804. Depending on the exact configuration and type of computing device, system memory 1804 may include volatile memory 1805 (such as RAM), non-volatile memory 1807 (such as ROM, flash memory, etc.) or some combination of the two. This most basic configuration is illustrated in FIG. 8 by dashed line 1806. Additionally, computing device 1800 may also have additional features/functionality. For example, computing device 1800 may also include additional storage (removable and/or non-removable) including, but not limited to, magnetic or optical discs or tape. Such additional storage is illustrated in FIG. 8 by removable storage 1808 and non-removable storage 1810.

Computing device 1800 may also contain communications connection(s) 1812 such as one or more network interfaces and transceivers that allow the device to communicate with other devices. Computing device 1800 may also have input device(s) 1814 such as keyboard, mouse, pen, voice input device, touch input device, gesture input device, etc. Output device(s) 1816 such as a display, speakers, printer, etc. may also be included. These devices are well known in the art so they are not discussed at length here.

In embodiments, illustrated and described signal paths are media that transfers a signal, such as an interconnect, conducting element, contact, pin, region in a semiconductor substrate, wire, metal trace/signal line, or photoelectric conductor, singly or in combination. In an embodiment, multiple signal paths may replace a single signal path illustrated in the figures and a single signal path may replace multiple signal paths illustrated in the figures. In embodiments, a signal path may include a bus and/or point-to-point connection. In an embodiment, a signal path includes control and data signal lines. In still other embodiments, signal paths are unidirectional (signals that travel in one direction) or bidirectional (signals that travel in two directions) or combinations of both unidirectional signal lines and bidirectional signal lines.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. A method to operate a computing device, the method comprising:
   receiving information;
   determining whether an application has access to an external computing device having a network address;
   obtaining an indication of consent when the application has access to the external computing device; and
   providing the information to the application when the application is identified as a trusted application, based on an authorization list read from the application, and does not have access to the external computing device or the indication of consent is obtained, wherein
   the network address is stored with a signature that includes a code, the network address and signature are included in the application and the determining includes decrypting the code to determine whether the network address is included in a plurality of authorized network addresses.

2. The method of claim 1, wherein the determining includes determining whether the network address is included in the plurality of authorized network addresses read from the authorization list.

3. The method of claim 1, wherein receiving and determining is at least partially performed by an operating system and the application includes an electronic interactive game.

4. The method of claim 1, further comprising outputting the information to the network address.

5. The method of claim 1, wherein the external computing device includes a network address and the method further comprising obtaining information that is sensitive information, wherein the sensitive information includes a video signal or personal information.

6. The method of claim 5, wherein the computing device is a game and media console and the application is an electronic interactive game.

7. The method of claim 6, wherein the computing device includes a camera to obtain the video signal.

8. The method of claim 1, wherein the obtaining the indication of consent includes providing a menu to a display to enable a selection of consent to output the information to the external computing device and storing the selection associated with the application.

9. The method of claim 1, wherein the obtaining the indication of consent includes outputting a voice asking for consent, interpreting an answer and storing the answer associated with the application.

10. An apparatus comprising;
    at least one camera to obtain a video signal;
    at least one processor; and
    at least one processor readable memory to store an application having processor readable instructions and a network address to a computing device, and the at least one processor readable memory to store an operating system configured to allow the application have access to the computing device at the network address,
    wherein the at least one processor executes the processor readable instructions of the operating system and the application to:

receive, by the operating system, the video signal, determine, by the operating system, whether the application has authorization to access the computing device at the network address, obtain, by the operating system, an indication of consent to output the video signal to the computing device at the network address, and provide the video signal to the application in response to the indication of consent and determination whether the application has authorization to access the computing device at the network address, wherein the network address is stored with a signature that includes a code, the network address and signature are included in the application and the instruction to determine includes decrypting the code to determine whether the network address is included in a plurality of authorized network addresses.

11. The apparatus of claim 10, wherein the determination, by the operating system, includes a decryption of an encrypted value to a decrypted value associated with the network address in the application.

12. The apparatus of claim 11, wherein the application is configured to enable access to the computing device at the network address when the decrypted value matches a predetermined value stored in the operating system.

13. The apparatus of claim 10, wherein the indication of consent is obtained by providing a menu to a display to enable a selection of consent to output the video signal to the computing device at the network address.

14. The apparatus of claim 10, wherein the apparatus is included in a game console and the application is an electronic interactive game.

15. One or more processor readable memories having instructions encoded thereon which when executed cause one or more processors to perform a method, the method comprising:

receiving information including at least a frame of a video signal;

accessing a signature associated with a network address;

decrypting the signature to obtain a decrypted value;

comparing the decrypted value with a predetermined value; and obtaining an indication of consent to output the information to the network address; and outputting the information to an application in response to the comparing and the indication of consent, wherein the signature and network address are included in the application stored on one or more processor readable memories having instructions encoded thereon which when executed cause one or more processors to execute the application.

16. The one or more processor readable memories of claim 15, wherein at least the receiving, accessing, decrypting and comparing are performed by an operating system.

17. The one or more processor readable memories of claim 16, wherein the obtaining the indication of consent includes providing a menu to a display to enable a selection of consent to output at least a frame of the video signal to the network address.

* * * * *